United States Patent
Taniguchi

[19]

[11] Patent Number: 5,883,892
[45] Date of Patent: Mar. 16, 1999

[54] STORAGE TYPE DATA COMMUNICATION TERMINAL

[75] Inventor: Keiichi Taniguchi, Tokyo, Japan

[73] Assignee: NEC Corporation, Tokyo, Japan

[21] Appl. No.: 718,827

[22] Filed: Sep. 24, 1996

[30] Foreign Application Priority Data

Sep. 25, 1995 [JP] Japan .................................. 7-246160

[51] Int. Cl.⁶ ............................ H04L 12/50; H04Q 11/00
[52] U.S. Cl. ........................................... 370/368; 370/429
[58] Field of Search .................................. 370/331, 357, 370/360, 366, 368, 370, 374, 412, 428, 429

[56] References Cited

U.S. PATENT DOCUMENTS

| | | | |
|---|---|---|---|
| 4,672,662 | 6/1987 | Nishino et al. | 379/277 |
| 5,276,687 | 1/1994 | Miyamoto | 370/420 |
| 5,293,418 | 3/1994 | Fukawa | 455/458 |
| 5,365,582 | 11/1994 | Yamada et al. | 379/265 |
| 5,481,591 | 1/1996 | Suzuki | 455/456 |

FOREIGN PATENT DOCUMENTS 0 361 350 A2  4/1990  European Pat. Off. .
61-156095    7/1986  Japan .
2 292 503 A  2/1996  United Kingdom .

*Primary Examiner*—Ajit Patel
*Assistant Examiner*—Bob A. Phunkulh
*Attorney, Agent, or Firm*—Sughrue, Mion, Zinn, Macpeak & Seas, PLLC

[57] ABSTRACT

In a storage type data communication terminal, a first switch section is connected to a power feeder and turned on/off by an operator. A second switch section is connected in parallel with the first switch section and turned on/off in accordance with a control signal. An external interface section performs connection to an external information processing device. A data storage section temporarily stores data received through the external interface section. An Air interface section sequentially transmits the data stored in the data storage section to a distant station through a communication channel in accordance with a communication sequence, and stores data received from the distant station. A control section switches the second switch section from an OFF state to an ON state at the same time when a connection phase of the communication sequence is completed. When the first switch section is turned off during a communication phase, the control section holds the second switch section in the ON state until reception of an acknowledgement from the distant station with respect to data transmitted immediately before the first switch section is turned off.

7 Claims, 6 Drawing Sheets

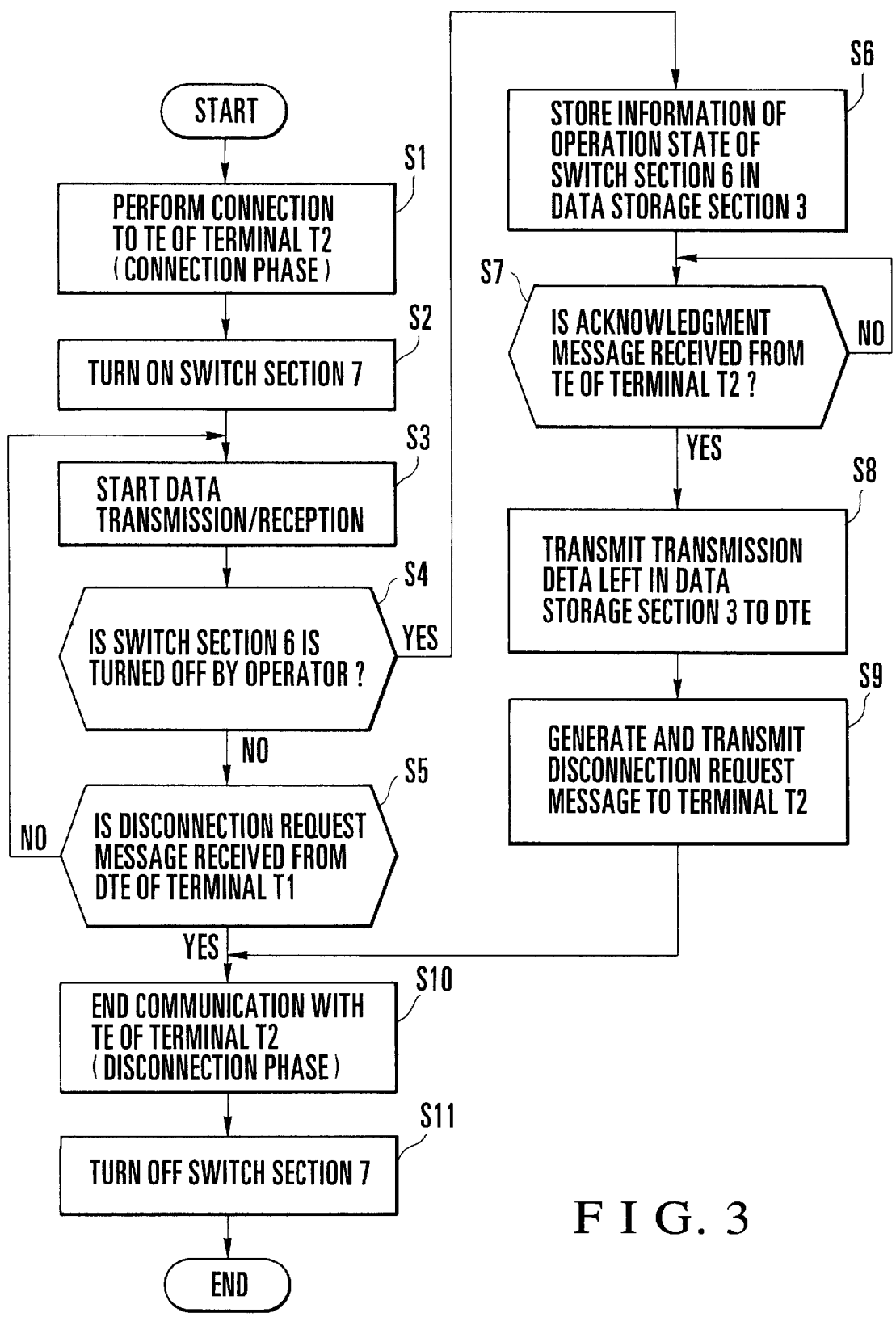
F I G. 3

STORAGE TYPE DATA COMMUNICATION TERMINAL

BACKGROUND OF THE INVENTION

The present invention relates to a storage type data communication terminal which provides communication services between terminals and between terminals and a center according to a communication sequence constituted by call connection, communication, and call release phases.

For example, as disclosed in Japanese Patent Laid-Open No. 61-156095, a conventional power control scheme is used to prolong the service life of the LCD section of a display connected to an apparatus, and realize labor saving and power saving in the apparatus itself. The above prior-art invention can be applied to communication terminals. For example, the power supply of a communication terminal may be controlled depending on the presence/absence of data in the buffer in the communication terminal. More specifically, the conventional technique may be applied in such a manner that the power supply of the apparatus is kept on when data is present in the buffer in the apparatus.

If, however, the above conventional technique is applied, the following problems are posed. The reasons why the problems are posed will be described with reference to sequences in FIGS. 5 to 7. FIG. 5 shows a communication sequence to be followed when communication is to be performed between storage type radio data communication terminals (to be referred to as TEs hereinafter). FIG. 6 shows a communication phase in the communication sequence in FIG. 5 in detail. FIG. 7 is a communication sequence to be followed when the power supply of a TE is reset by an operator in the sequence in FIG. 5. In this case, the term "TE" means a radio data communication terminal having a function of automatically dividing data transmitted from an external information processing device (to be referred to as a DTE hereinafter) on the operator side in a given unit (to be referred to as a packet hereinafter), and checking an error in units of packets in radio communication with a radio data communication terminal.

The following case is posed as the first problem.

Assume that a TE is operated according to the sequence in FIG. 5. In the connection phase shown in FIG. 5, upon reception of a connection request message from the TDE of a terminal T1, the TE of the terminal T1 transmits this connection request message to the TE of a terminal T2 through a radio channel. The TE of the terminal T2 receives the connection request message from the TE of the terminal T1 and outputs a termination designation message to the DTE of the terminal T2. The TE of the terminal T2 also returns a connection response message to the DTE of the terminal T1 through the TE of the terminal T1. Thereafter, in the communication phase, transmission data is exchanged between the DTE of the terminal T1 and the DTE of the terminal T2 through the TEs of both the terminals. When exchange of transmission data is completed, the TE of the terminal T1 transmits a disconnection request message from the DTE of the terminal T1 to the TE of the terminal T2 through a radio channel in the disconnection phase. The TE of the terminal T2 receives the disconnection request message from the TE of the terminal T1 and outputs a disconnection designation message to the DTE of the terminal T2. The TE of the terminal T2 also returns a disconnection response message to the DTE of the terminal T1 through the TE of the terminal T1.

FIG. 6 shows the communication phase in FIG. 5 in detail. Upon reception of transmission data from the DTE of the terminal T1, the TE of the terminal T1 divides the data into 1st to Nth packets and transmits them to the TE of the terminal T2 through a radio channel. Every time the TE of the terminal T2 receives a packet from the TE of the terminal T1, the TE returns an acknowledgement message to the TE of the terminal T1. Upon reception of all the packets, the TE of the terminal T2 outputs the transmission data to the DTE of the terminal T2. When the above prior-art invention is applied to this terminal, the power supply of the apparatus may be turned off upon completion of a predetermined communication sequence.

As is well known, the electric field level of a radio channel greatly varies, and the channel quality is not always good all the time. For this reason, when the channel quality deteriorates, the TE which operates according to the sequence in FIG. 5 repeatedly transmits a packet or an acknowledgement message with respect to a packet in the communication phase (FIG. 6). Since this operation is performed by the TE itself, the operator of the TE and the DTE cannot grasp the operation state at all. In this case, the operator may forcibly turn off the power supply of the apparatus by operating the power switch, thereby forcibly disconnecting the channel.

If, however, the conventional technique is applied, since supply of power is automatically maintained until a predetermined sequence is completed, the operator cannot forcibly disconnect the channel through which communication is currently performed. For this reason, if the above prior-art invention is applied, in a state wherein a communication channel is unstable, communication cannot be ended until the timeout of the communication sequence.

In applying the above prior-art invention to a communication terminal, even when channel quality deteriorates, the operator cannot immediately disconnect the channel, but needs to wait until the timeout of the communication sequence. This causes an inconvenience to the user.

The following case is posed as the second problem. Assume that the TE operates according to the sequence shown in FIG. 5, and the above prior-art invention is not used. When the operator turns off the power supply of the TE of the terminal T1 while the TE of the terminal T1 is transmitting data as shown in FIG. 7, the TE of the terminal T1 cannot receive an acknowledgement message from the TE of the terminal T2 with respect to a packet transmitted immediately before the power supply is turned off. In addition, since the sequence of packet transmission and acknowledgement reception is directly performed between the TEs, the operator cannot perform transmission/reception control. For this reason, the operator cannot know up to which packet transmission has been completed. In the case shown in FIG. 7, since the TE of the terminal T1 cannot receive an acknowledgement message with respect to the second packet, the Te cannot check whether the terminal T2 could transmit the second packet.

If, therefore, the operator turns off the power supply of the TE while the TE is performing communication, the operator cannot know whether data transmitted immediately before the power supply is turned off is received or not. In order to reliably transmit the data to the destination, the operator must transmit the same data as that transmitted immediately before the turn-off operation of the power supply again. The transmission efficiency deteriorates from the viewpoint of the operator.

SUMMARY OF THE INVENTION

It is an object of the present invention to provide a storage type data communication terminal which notifies an operator of data which cannot be communicated when a power switch is turned off during data communication.

It is another object of the present invention to provide a storage type communication terminal which improves transmission efficiency when a power switch is turned off during data communication.

In order to achieve the above objects, according to the present invention, there is provided a storage type data communication terminal for performing communication according to a communication sequence constituted by call connection, communication, and call release phases, comprising first switch means which is connected to a power feeder and is turned on/off by an operator, second switch means which is connected in parallel with the first switch means and is turned on/off in accordance with a control signal, external interface means for performing connection to an external information processing device, data storage means for temporarily storing data received through the external interface means, channel interface means for sequentially transmitting the data stored in the data storage means to a distant station through a communication channel in accordance with the communication sequence, and storing data received from the distant station in the data storage means, and control means for performing control to switch the second switch means from an OFF state to an ON state at the same time when a connection phase of the communication sequence is completed, and for, when the first switch means is turned off during the communication phase, holding the second switch means in the ON state until reception of an acknowledgement from the distant station with respect to data transmitted immediately before the first switch means is turned off.

BRIEF DESCRIPTION OF THE DRAWINGS

FIG. 3 is a flow chart showing the operation of the data communication terminal in FIG. 1;

DESCRIPTION OF THE PREFERRED EMBODIMENT

An embodiment of the present invention will be described next with reference to the accompanying drawings.

Figure 1:
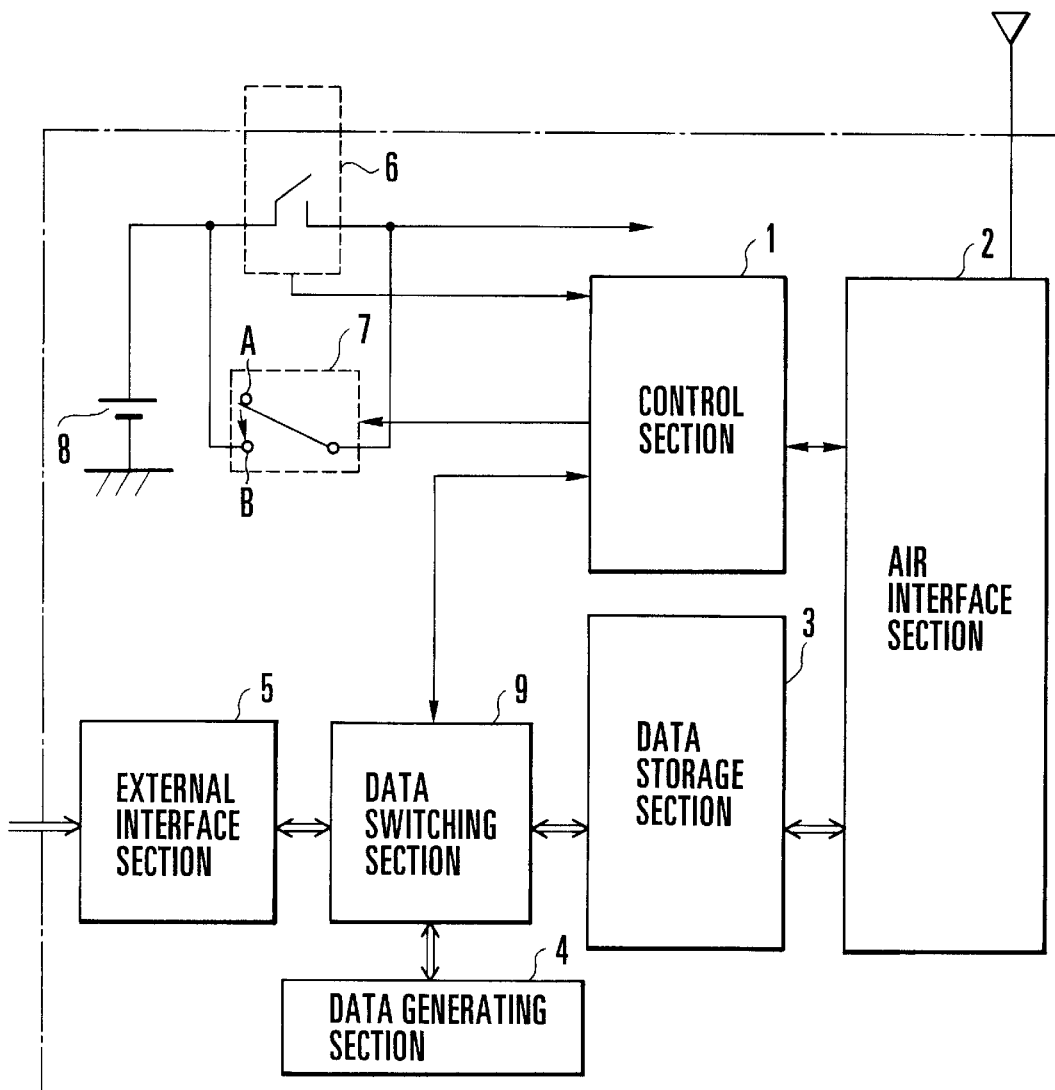
FIG. 1 is a block diagram showing a storage type data communication terminal according to an embodiment of the present invention.
Figure 2:
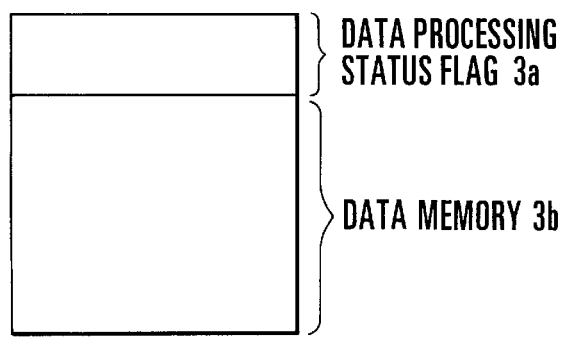
FIG. 2 is a view showing the structure of a data storage section in FIG. 1.

FIG. 1 shows a storage type data radio communication terminal according to an embodiment of the present invention. FIG. 2 shows the structure of a data storage section.

As shown in FIG. 1, the storage type data radio communication terminal (TE) of this embodiment comprises a control section 1, an Air interface section 2, a data storage section 3, a data generating section 4, an external interface section 5, a switch section 6 as a first switch section, a switch section 7 as a second switch section, and a power supply section 8.

The control section 1 operates according to programs to designate the operation of each element and perform an overall control operation.

The Air interface section 2 modulates data output from the data storage section 3 into data which can be transmitted/received by radio. The Air interface section 2 transmits modulated data to a radio zone, and demodulates received modulated data to output it to the data storage section 3.

As shown in FIG. 2, the data storage section 3 is constituted by a data processing status flag 3a and a data memory 3b. The data storage section 3 temporarily stores actual transmission/reception data output from the data generating section 4 in the data memory 3b, and holds information of the status of the switch section 6 operated by the operator in the data processing status flag 3a.

The data generating section 4 disassembles transmission data output from the external interface section 5 into N packets, and sequentially transmits them to the data storage section 3. Alternatively, the data generating section 4 performs a reverse process to the above process, i.e., assembling packets into transmission data. In addition, the data generating section 4 generates various control messages such as an acknowledgement message in a radio zone.

The external interface section 5 is a terminal section for connection to an external information processing device (DTE) through a cable or the like. The external interface section 5 performs matching with the DTE in terms of voltage level as an electrical standard and pin shape and arrangement as physical standards.

The switch section 6 is a switch having physical contacts A and B which are operated by the operator to be connected/disconnected to/from the power feeder connected to the output side of the power supply section 8, thus allowing the operator to turn on/off the power supply of the overall apparatus. The switch section 6 is operated by the operator to be closed, and the ON state is kept. When the switch section 6 is operated next, the switch is opened, and the OFF state is kept.

The switch section 7 is connected in parallel with the switch section 6. The switch section 7 cannot be controlled by the operator but operates only under the control of the control section 1. An interrupt signal is output from the control section 1 to the switch section 7 in accordance with the state of a communication sequence, and the switch section 7 electrically connects the two ends of the switch section 6 in accordance with the signal.

A data switching section 9 selectively connects the external interface section 5 to the data generating section 4, and the data generating section 4 to the data storage section 3 in accordance with an instruction from the control section 1. Note that the data switching section 9 may be omitted, and the control section 1 may perform data input/output control for the data storage section 3, the data generating section 4, an the external interface section 5 connected to a common data bus.

The operation of the above storage type data communication terminal (TE) will be briefly described next.

Figure 5:
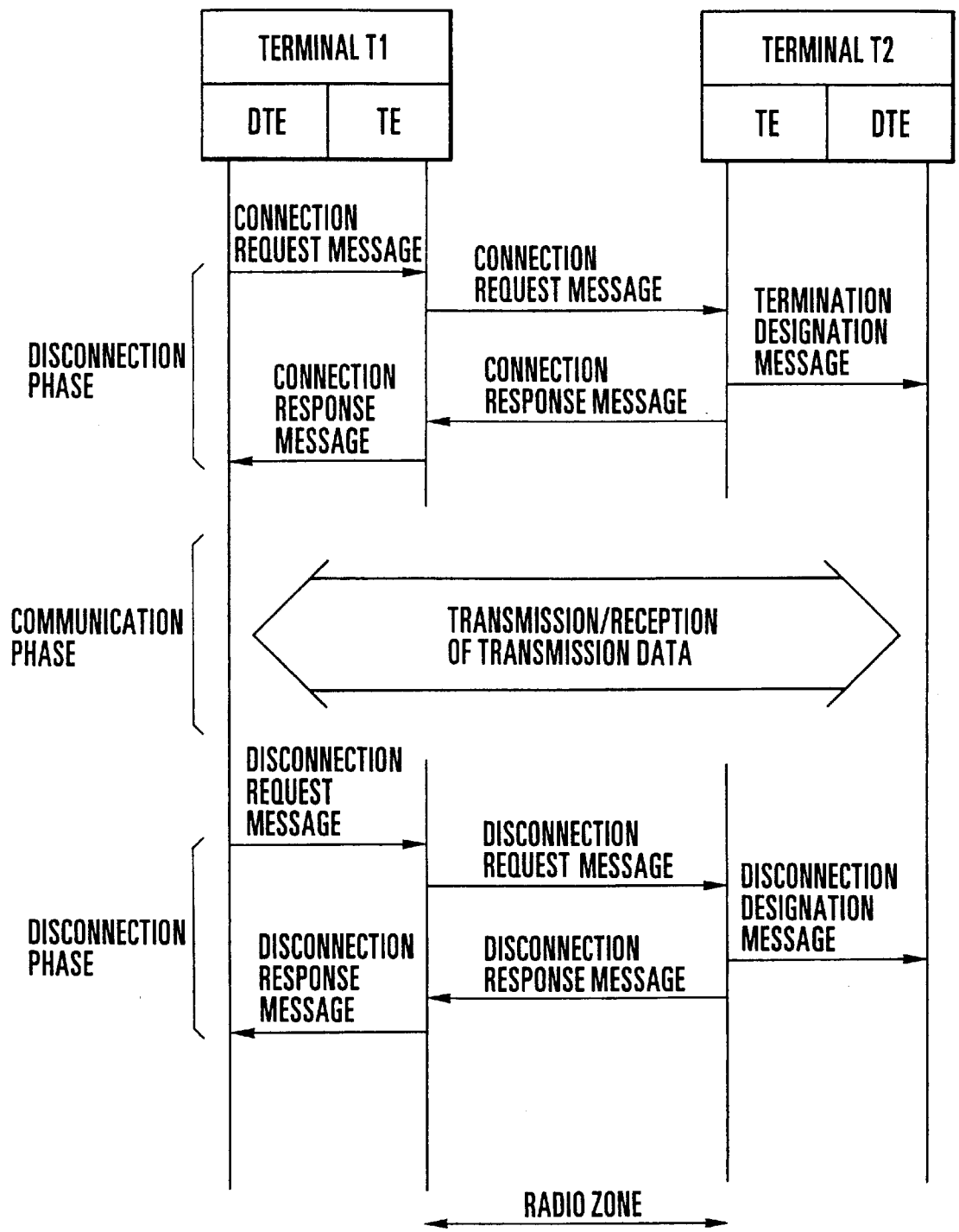
FIG. 5 is a view showing a communication sequence in a conventional storage type data communication terminal in a normal operation.
Figure 6:
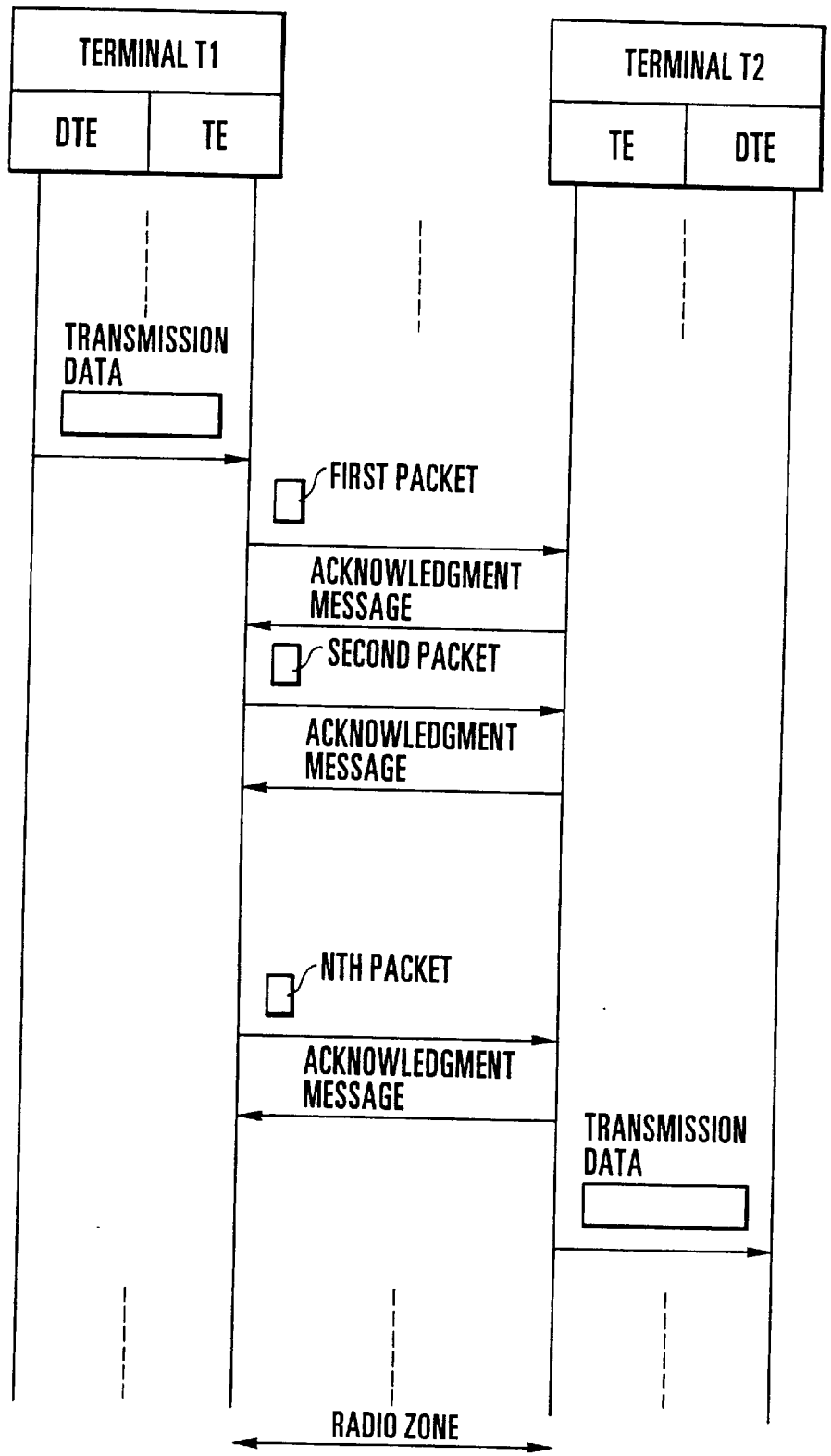
FIG. 6 is a view showing a sequence in a communication phase in FIG. 5 in detail.
Figure 7:
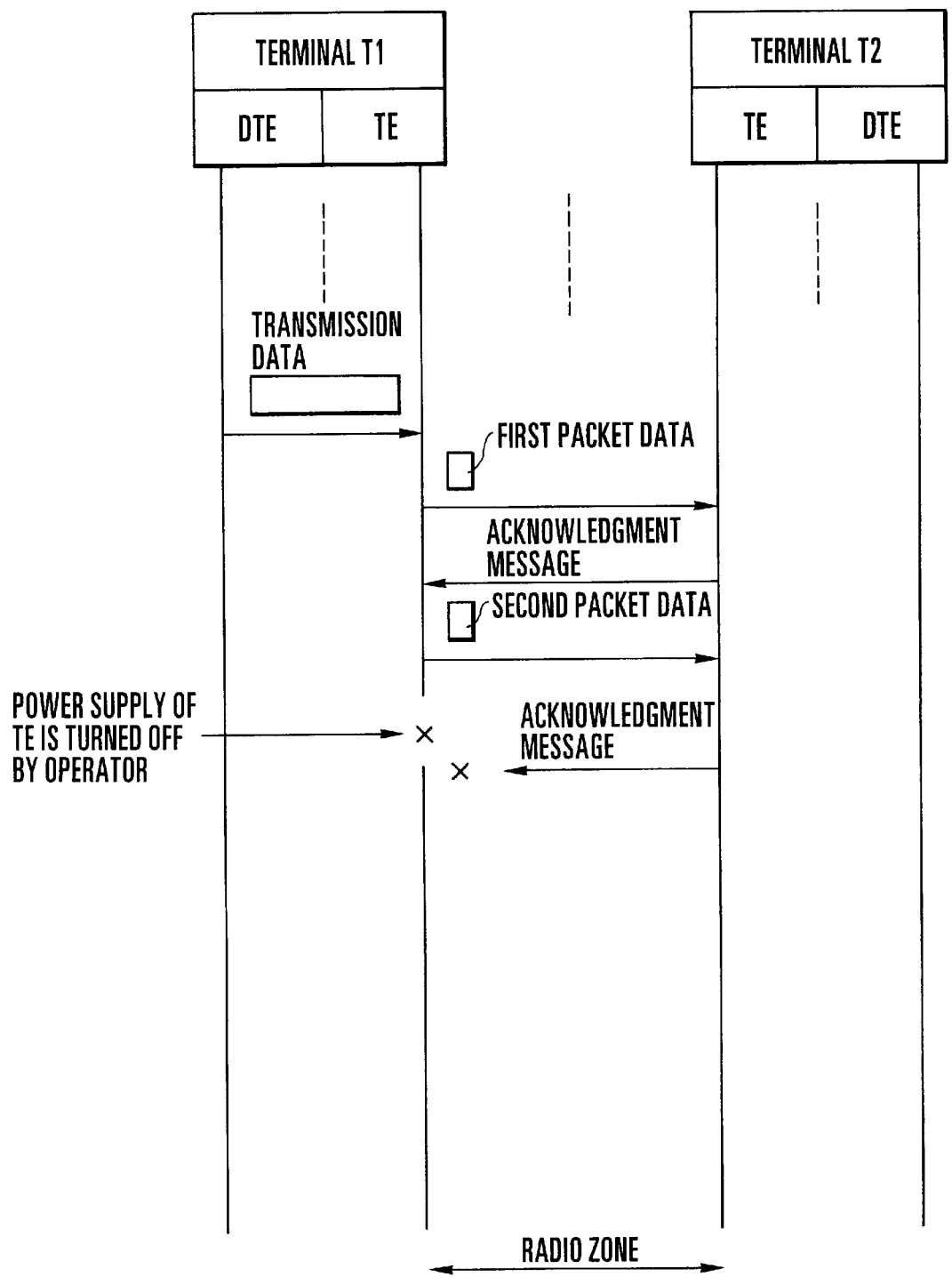
FIG. 7 is a view showing a communication sequence in the conventional storage type data communication terminal.

Similar to the conventional TE, the sequence for normal communication in FIG. 5 is set in this TE. Assume that the power supply of the TE is turned off when the communication phase starts upon completion of the connection phase. In this case, in the TE, the control section 1 instructs the switch section 7 to switch a contact A to a contact B immediately after the communication phase starts. In this communication phase, data is properly transmitted according to the sequence in FIG. 6 until the power supply of the TE is turned off.

In this case, when the operator turns off the switch section 6 as the power switch of the TE during communication of data from the TE to the distant TE, the status of the switch section 6 is immediately notified to the control section 1. The control section 1 only holds the status in the data processing status flag 3a of the data storage section 3, but does not turn off the power supply. This is because, in this case, the switch section 7 has been switched from the contact A to the contact B at the start of the communication phase, although the switch section 6 is in the open state, and the two ends of the switch section 6 are short-circuited by the switch section 7, i.e., power is kept supplied from the power supply section 8 to the control section 1.

It is only after the above state that the TE interrupts transmission of packets upon reception of an acknowledgement message from the distant TE. At this time, since packets which have not been transmitted to the distant TE are stored in the data memory 3b in the data storage section 3, the control section 1 transmits the packets left in the data memory 3b in the data storage section 3 to the DTE through the external interface section 5.

After this operation, the control section 1 instructs the data generating section 4 to generate a disconnection request message. Upon reception of the instruction, the data generating section 4 generates a disconnection request message, and transmits it to the distant station through the data storage section 3 and the Air interface section 2. The control section 1 then waits for reception of a disconnection response message as a response to the transmitted disconnection request message.

Upon reception of the disconnection response message, the control section 1 instructs the switch section 7 to switch the contact B to the contact A. In accordance with this instruction, supply of power to the TE depends on the state of the switch section 6 instead of the state of the switch section 7. Therefore, the TE shifts to the state of the switch section 6 operated by the operator, i.e., the OFF state.

Figure 4:
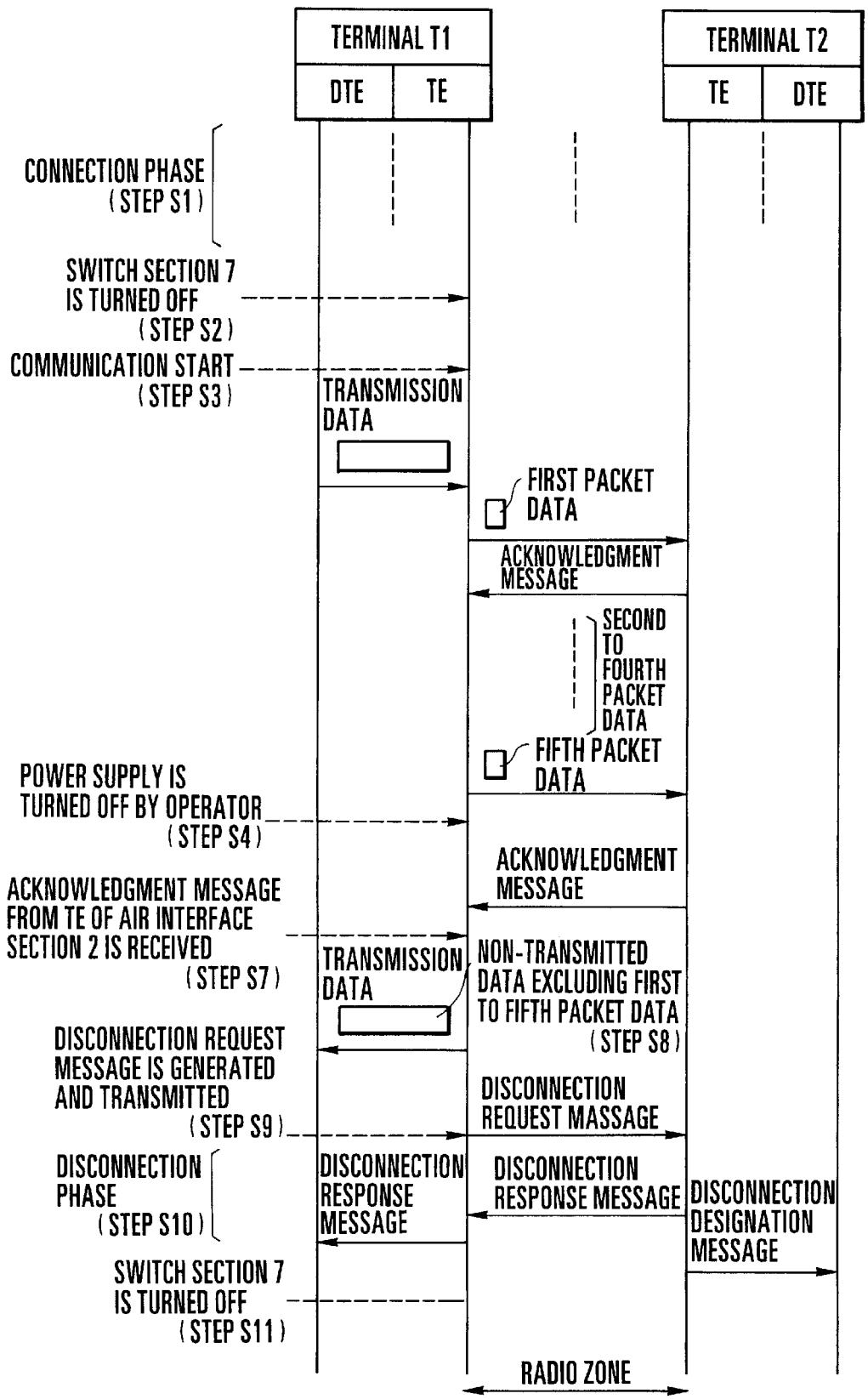
FIG. 4 is a view showing a communication sequence in the data communication terminal in FIG. 1.

The operation of the TE will be described in more detail next with reference to FIGS. 3 and 4. FIG. 3 shows the operation of the TE. FIG. 4 shows a communication sequence between the TE and the distant TE. The communication sequence in FIG. 4 includes the steps in FIG. 3 to explain the operation of the TE as well as the communication sequence between the TEs. A terminal T1 in FIG. 4 is constituted by the TE for performing the operation in FIG. 3 and a DTE connected to the TE. A terminal T2 is constituted by the distant TE and a DTE connected thereto.

When the terminal T1 performs connection to the terminal T2, the terminal T1 transmits a connection request message from the DTE to the TE of the terminal T1. Upon reception of this message, the TE of the terminal T1 transmits the connection request message to the TE of the terminal T2 through the external interface section 5, the data generating section 4, the data storage section 3, and the Air interface section 2. Upon reception of the connection request message from the TE of the terminal T1, the TE of the terminal T2 transmits a connection response message as a response to the above message to the TE of the terminal T1. When the TE of the terminal T1 receives this message, connection to the TE of the terminal T2 is completed, and transmission/reception of data can be performed (step S1).

The control section 1 instructs the switch section 7 to switch the contact A to the contact B, thus switching the switch section 7 from the open (OFF) state to the short-circuited (ON) state (step S2). As a result, the terminals T1 and T2 are set in the communication state, and actual data can be transmitted/received. When data having an arbitrary length is transmitted from the DTE to the TE on the terminal T1 side, the data is sent to the data generating section 4 through the external interface section 5. The data generating section 4 disassembles this data into N small blocks (each block will be referred to as a packet hereinafter) each having a unit length. An actual data communication sequence is executed according to the above process. The data disassembled into the packets is transmitted to the data memory 3b in the data storage section 3 and sequentially transmitted to the terminal T2 through the Air interface section 2 (step S3). The terminal T2 on the reception side performs a reverse process to the above process to assemble the N small blocks into the data of the arbitrary length. This process will be omitted.

Assume that the data of the arbitrary length is disassembled into 12 packets, transmission of the first to fourth packets is completed, and the operator of the terminal T1 turns off the switch section 6 during transmission of the fifth packet. In this case, the contacts of the switch section 6 are mechanically switched from the ON state to the OFF state. The control section 1 recognizes that the switch section 6 is turned off (step S4). At this time, however, the control section 1 gives no instruction accompanying the change in the state of the switch section 6, but only holds information of the status of the switch section 6 in the data processing status flag 3a of the data storage section 3 (step S6). After the control section 1 recognizes in step S4 that the switch section 6 is switched from the ON state to the OFF state, the control section 1 waits for an acknowledgement message transmitted from the TE of the terminal T2 with respect to the fifth packet (step S7). If the control section 1 determines in step S7 that the acknowledgement message from the TE of the terminal T2 is received, and the status is written in the data processing status flag 3a in the data storage section 3, the flow advances to the next step.

In the current state, all the 12 packets are to be transmitted, and the 6th to 12th packets are stored in the data memory 3b of the data storage section 3 because transmission of the 1st to 5th packets is completed (confirmed by the acknowledgement message). When step S7 is completed, the control section 1 transmits the 6th to 12th packets to the DTE through the external interface section 5, together with the data processing status flag 3a (step S8).

After this operation, the control section 1 instructs the data generating section 4 to generate a disconnection request message. After the disconnection request message is generated by the data generating section 4, the control section 1 transmits the message to the TE of the terminal T2 through the data storage section 3 and the Air interface section 2 (step S9). Thereafter, the Te of the terminal T1 waits for a disconnection confirmation message from the TE of the terminal T2. When the TE of the terminal T1 confirms reception of the disconnection confirmation message, the control section 1 ends the communication with the TE of the terminal T2 (step S10).

Upon confirming the reception of the disconnection confirmation message transmitted from the terminal T2, the control section 1 instructs the switch section 7 to switch the short-circuited state (ON) to the open state (OFF). Upon reception of this instruction, the switch section 7 switches the contact B to the contact A. As a result, the switch section 7 switches the short-circuited state to the open state (step S11). With this operation, supply of power to the switch section 7 is stopped, and hence supply of power to the TE of the terminal T1 depends on the state of the switch section 6.

If it is determined in step S4 that the operator does not turn off the power supply of the TE of the terminal T1, it is checked whether a disconnection request message is received from the DTE of the terminal T1 (step S5). If it is determined in step S5 that a disconnection request message is received, the flow advances to steps S10 and S11 to end the communication operation.

The operation of the TE of the terminal T1 which accompanies the operation of the switch section 6 by the operator is executed at this timing. More specifically, even if the operator turns off the power switch 6 during transmission of a packet, supply of power to the TE of the terminal T1 is not immediately stopped, but the communication channel is disconnected when the packet is transmitted. In addition, transmission data which has not been transmitted to the distant station is notified to the DTE.

As is apparent, the present invention can be applied to a wired storage type data communication terminal.

As has been described above, according to the present invention, in the storage type data communication terminal, when the operator turns off the power switch during transmission of data, a change in the state of the power supply due to the power switch is invalid, and data for which transmission to the distant station is completed before the operator turns off the power supply after execution of call connection for a communication channel is reliably transmitted to the distant station. In addition, since the DTE, i.e., the operator, can recognize non-transmitted data, a radio channel can be efficiently used, and improvements in transmission efficiency and operability can be realized.

What is claimed is:

1. A storage type data communication terminal for performing communication according to a communication sequence constituted by call connection, communication, and call release phases, comprising:

first switch means which is connected to a power feeder and is turned on/off by an operator;

second switch means which is connected in parallel with said first switch means and is turned on/off in accordance with a control signal;

external interface means for performing connection to an external information processing device;

data storage means for temporarily storing data received through said external interface means;

channel interface means for sequentially transmitting the data stored in said data storage means to a distant station through a communication channel in accordance with the communication sequence, and storing data received from the distant station in said data storage means; and control means for performing control to switch said second switch means from an OFF state to an ON state at the same time when a connection phase of the communication sequence is completed, and for, when said first switch means is turned off during the communication phase, holding said second switch means in the ON state until reception of an acknowledgement from the distant station with respect to data transmitted immediately before said first switch means is turned off.

2. A terminal according to claim 1, further comprising data generating means for generating a control message for designating channel disconnection, and wherein said control means transmits the control message generated by said data generating means to the distant station upon reception of an acknowledgement and automatically disconnects a channel, and then performs control to switch said second switch from the ON state to the OFF state, thereby canceling a short circuit of said first switch means.

3. A terminal according to claim 2, wherein said control means transmits remaining data stored in said data storage means to said external information processing device through said external interface means before said control means performs control to switch said second switch means from the ON state to the OFF state.

4. A terminal according to claim 2, wherein said control means stores status information indicating power-off in said data storage means when said first switch means is turned off in the communication phase, and controls said second switch means on the basis of the status information stored in said data storage means upon confirmation of an acknowledgement from the distant station.

5. A terminal according to claim 1, further comprising data generating means for disassembling data received through said external interface means into a plurality of packets to output the packets to said data storage means, and assembling packets received from the distant station through said channel interface means to output assembled data to said external interface means.

6. A storage type data communication terminal for performing communication according to a communication sequence constituted by call connection, communication, and call release phases, characterized by comprising:

first switch means which is connected to a power feeder and is turned on/off by an operator;

second switch means which is connected in parallel with said first switch means and is turned on/off in accordance with a control signal;

external interface means for performing connection to an external information processing device;

data storage means for temporarily storing data received through said external interface means, said data storage means storing status information indicating power-off;

channel interface means for sequentially transmitting the data stored in said data storage means to a distant station according to the communication sequence, and storing data received from the distant station in said data storage means;

data generation means for generating a control message for designating channel disconnection; and control means for performing control to switch said second switch means from the OFF state to the ON state at the same time when a connection phase of the communication sequence is completed, storing status information in said data storage means when said first switch means is turned off in the communication phase, automatically disconnecting a channel by transmitting a control message generated by said data generating means to the distant station on the basis of the status information stored in said data storage means upon reception of an acknowledgement from the distant station with respect to data immediately transmitted before said first switch means is turned off, and performing control to switch said second switch means from the ON state to the OFF state to cancel a short circuit of said first switch means after remaining data stored in said data storage means is transmitted to said external information processing device through said external interface means.

7. A terminal according to claim 6, wherein said data generating means disassembles data received through said external interface means into a plurality of packets to output packets to said data storage means, and assembling packets received from the distant station through said channel interface means to output assembled data to said external interface means.

* * * * *